United States Patent [19]

Kurihara et al.

[11] Patent Number: 4,535,547
[45] Date of Patent: Aug. 20, 1985

[54] MOUNT FOR AN EARTH MAGNETISM SENSOR FOR USE IN AN AUTOMOTIVE VEHICLE

[75] Inventors: Norimitsu Kurihara, Saitama; Toshiyasu Suzuki, Tokyo; Takashi Iwanaga; Masaru Hisadomi, both of Saitama, all of Japan

[73] Assignee: Honda Giken Kogyo Kabushiki Kaisha, Tokyo, Japan

[21] Appl. No.: 345,415

[22] Filed: Feb. 3, 1982

[30] Foreign Application Priority Data

Feb. 4, 1981 [JP] Japan .................................. 56-15155
Jun. 2, 1981 [JP] Japan .................................. 56-84846

[51] Int. Cl.³ ............................................. G01C 17/38
[52] U.S. Cl. ......................................... 33/356; 33/361
[58] Field of Search ..................... 33/361, 356, 355 R, 33/357, 358, 359, 363 Q, 355

[56] References Cited

U.S. PATENT DOCUMENTS

| | | | |
|---|---|---|---|
| 1,601,081 | 9/1926 | Page | 33/355 |
| 3,355,705 | 11/1967 | Koerner | 33/356 |
| 3,541,853 | 11/1970 | Anderson | 33/356 |
| 3,621,584 | 11/1971 | Burt | 33/356 |
| 3,991,361 | 11/1976 | Mattern et al. | 33/356 |
| 4,104,803 | 8/1978 | Hoeppel | 33/356 |
| 4,124,897 | 11/1978 | Martin | 33/356 |

FOREIGN PATENT DOCUMENTS 57-42807 3/1982 Japan .................................. 33/356

Primary Examiner—Willis Little
Attorney, Agent, or Firm—Irving M. Weiner; Pamela S. Burt

[57] ABSTRACT

A mount for an earth magnetism sensor device for use in a bearing detecting apparatus which is to be provided on an automotive vehicle adapted to detect a horizontal component of the earth magnetism, characterized in that an axis of detecting a primary direction of the earth magnetism sensor means is offset in the horizontal direction in coincidence with an extent of magnetic declination at a given spot of observation with respect to a desired orientation by way of a map.

3 Claims, 14 Drawing Figures (a)

(b)

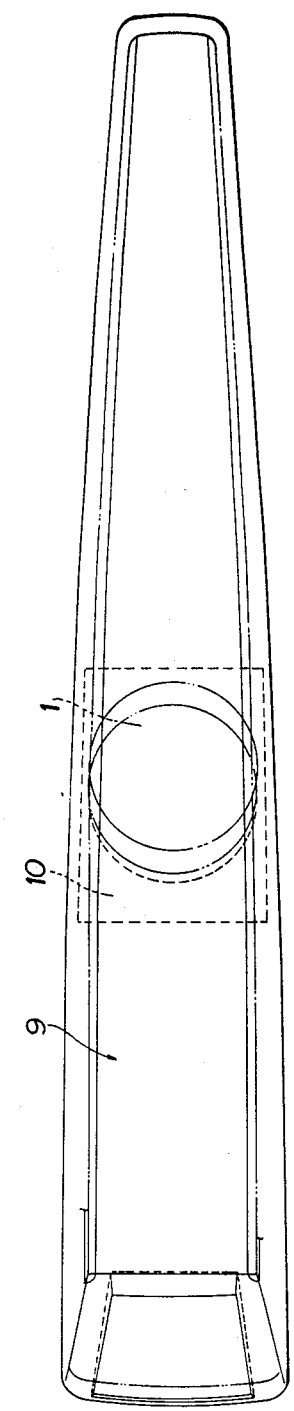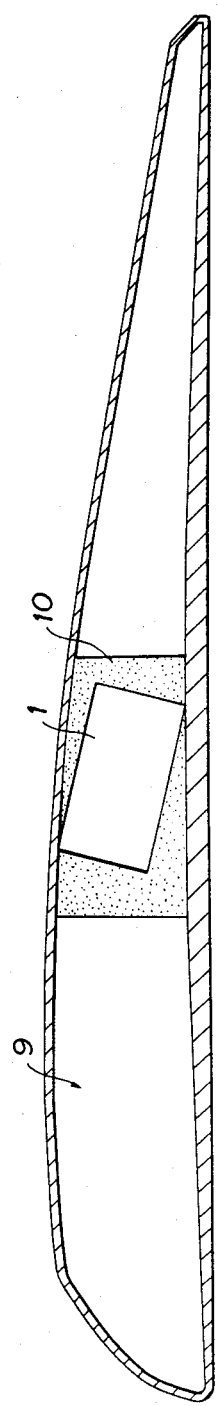

MOUNT FOR AN EARTH MAGNETISM SENSOR FOR USE IN AN AUTOMOTIVE VEHICLE

BACKGROUND OF THE INVENTION

1. Field of the Invention

The present invention relates to an improvement in or relating to mounting of an earth or terrestrial magnetism sensor for use in a bearing detector for a vehicle more particularly, the invention relates to an improved mounting of an earth magnetism sensor for use in a bearing detecting apparatus to be provided in an automobile vehicle, which is designed for visually indicating a current bearing or azimuth of the vehicle while following a desired route of travel by determining a relative relation (for instance, an angular or azimuthal relationship) between a current sensed horizontal component of the earth magnetism as detected from time to time and a current travel direction taken by the vehicle in its travel along the desired route.

2. Description of the Prior Art

It is generally known, as typically shown in FIG. 1, of the accompanying drawings that there is normally found a magnetic deviation or declination, i.e., a magnetic declination "$\theta$" varying in accordance with a given terrestrial spot between an azimuth or bearing reading as given by a magnetic direction finder which is located on that spot (as indicated in dotted line) and a given direction or orientation as taken by way of a map (as indicated in solid line). For instance, it is known in Japan that there is typically observed an extent of magnetic declination ranging from 6° to 10°, which varies from place to place as large as several units of tens of degrees according to the terrestrial location in the world. For this reason, it is inevitable that there would occur a certain extent of angular deviation which corresponds to a given magnetic declination of "$\theta$" particular to a spot of observation from a desired orientation by way of a map, when detecting a current travel direction taken by an automotive vehicle by using a magnetic direction finder which employs a terrestrial magnetism sensor which is designed to be provided on an automobile.

It is known that there have been developed apparatus for the determination of a current travel direction of an automotive vehicle, and visual indication thereof to the driver, which comprises a bearing detecting unit employing an earth magnetism sensor adapted to detect a current orientation and an extent of azimuthal deviation of the vehicle. Generally, the typical construction of such bearing detecting unit which incorporates an earth magnetism sensor is as shown in FIG. 2 of the accompanying drawings. Such bearing detecting unit comprises an element adapted to detect a magnetism component along the direction of the X-axis (for instance, the terrestrial "east" direction) only in terms of the X-Y coordinate plane and another element adapted to detect a magnetism component extending along the direction of the Y-axis (for instance, the terrestrial "north" direction). The thus-detected X- and Y-axis magnetism components are combined vectorwise, whereby a current due orientation of the earth magnetism can be detected properly in terms of the horizontal X-Y plane.

With the employment of a bearing detecting apparatus which incorporates an earth magnetism sensor, it is generally constructed, as schematically shown in FIG. 3 of the accompanying drawings, such that an electric signal for bearing detection of an automotive vehicle which is outputted from an earth magnetism sensor 1 is processed by a signal processing circuit 2, whereupon an indicating unit 3 is driven so as to provide a due indication of a current bearing of the vehicle.

When the bearing detecting apparatus of such construction is installed on a vehicle, it is preferred that the earth magnetism sensor 1 of such apparatus be placed in such a manner that it may be exempted from a possible influence of magnetization of the vehicle's body under the effect of magnetism from a steel structure such as a railroad of the DC-supply type through which the vehicle passes, such as when passing across a railroad crossing thereof as described hereinbelow. To this end, the sensor 1 is installed with its Y-axis (its X-axis) extending horizontally in coincidence with the running direction of the vehicle so as to visually indicate a current heading direction or azimuth of the vehicle by way of the visual display 3. In such arrangement, however, there would inevitably occur a certain error in indication of the current bearing detection on the display between a then azimuth of the vehicle as indicated by way of the display 3 and a given direction on the map to such an extent of angular deviation as involved from a certain magnetic declination "$\theta$" which is particular to a point of observation as stated above, if the Y-axis of the earth magnetism sensor 1 is put in coincidence with the current travel direction of the vehicle.

When the vehicle is under such conditions, it is very difficult or even impossible for the vehicle's driver to determine whether the displayed information on the screen is erroneous or his vehicle is actually moving in a different or improper way, thus resulting in substantial ambiguity.

In this respect, the present invention overcomes the inconveniences and difficulties encountered in the conventional bearing detecting apparatus for use in an automotive vehicle, which problems have not heretofore been attended to with any effective countermeasures therefor.

SUMMARY OF THE INVENTION

It is therefore a primary object of the present invention to provide an improved mounting of a bearing detecting apparatus for use in an automotive vehicle, which can afford efficient prevention of an angular deviation between the effect of a current direction of a horizontal component of the earth magnetism as detected from the earth magnetism sensor and a given direction as observed on the map in consideration of a due compensation of a possible magnetic declination which is particular to that point of observation, when installing the earth magnetism sensor of the bearing detecting apparatus.

According to the present invention, there is provided, as briefly summarized, an improved mounting of an earth magnetism sensor for use in a bearing detecting apparatus to be provided on an automotive vehicle, which is adapted to detect a horizontal component of the earth magnetism, characterized in that an axis of detecting a primary direction of the earth magnetism sensor means is offset in the horizontal direction in coincidence with an extent of magnetic declination at a given spot of observation with respect to a desired orientation by way of a map.

The above and further objects, details and advantages of the present invention will become more apparent from the following detailed description by way of a preferred embodiment of the invention, when read in conjunction with the accompanying drawings, in which like parts are designated with like reference numerals.

BRIEF DESCRIPTION OF THE DRAWINGS

FIGS. 12(a) and 12(b) are a top plan view and a side elevation, in section, respectively, showing another typical means for mounting the earth magnetism sensor.

DETAILED DESCRIPTION OF THE INVENTION

The present invention will now be described in detail by way of an exemplary preferred embodiment thereof, in conjunction with the accompanying drawings.

Figure 4:
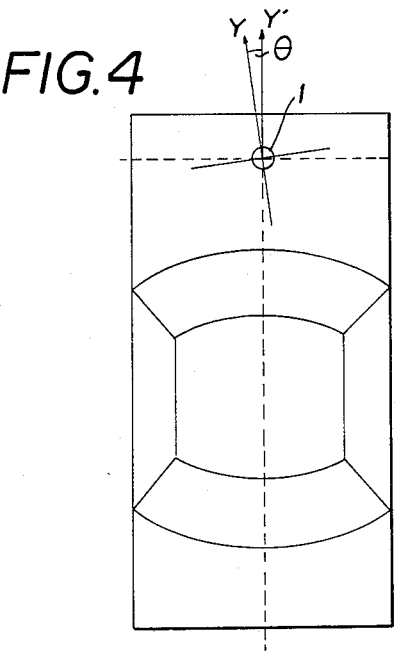
FIG. 4 is a schematic view which shows the location of the earth magnetism sensor as installed upon an automotive vehicle according to the present invention.
Figure 5:
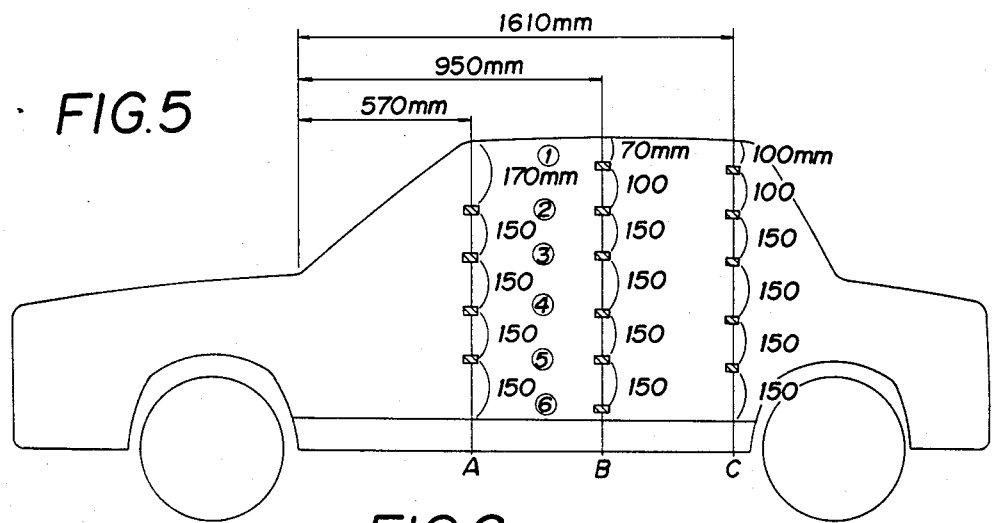
FIG. 5 is a schematic view showing the manner in which a multiplicity of earth magnetism sensors are disposed upon the body of an automotive vehicle so as to present the state of magnetization of the vehicle's body, such as when passing through a railroad crossing.

With reference to FIG. 4, there is shown schematically the typical and basic construction of an improved mounting of a current bearing detecting apparatus, or an earth magnetism sensor for use in an automotive vehicle, according to the present invention, which comprises, by way of a preferred embodiment thereof, an earth magnetism sensor 1 which is originally placed with its Y-axis angularly offset in the horizontal plane to an extent of angular deviation or magnetic declination "$\theta$" with respect to a current travel direction Y' of the vehicle.

With such arrangement, when the result of a current bearing detection of the automotive vehicle is indicated visually by way of the display 3 in accordance with the bearing detection signal from the earth magnetism sensor 1, the bearing or azimuth of the vehicle as obtained from such a specific arrangement coincides with the orientation on the map.

It is generally known that the vehicle's body would become magnetized due to a strong magnetic field as generated from a great current flowing from the electrical lines and the railroad tracks when the vehicle passes across a railroad crossing of a DC-powered railway, which would then substantially influence the bearing detecting apparatus on the vehicle, thus denormalizing the operation thereof. More specifically, it is very possible that the vehicle's body would generate a magnetic field having an intensity of from several fractions to several times as strong as the earth magnetism, once the vehicle's body gets magnetized under such conditions, thus resulting in a substantial error in the output from the earth magnetism sensor of the bearing detecting apparatus, which is designed to follow only the earth magnetism, to such an extent that it could no longer properly function.

Now, studying more specifically the characteristics of magnetization over the vehicle's body rendered under the aforesaid strong magnetic field effected by a railroad crossing or the like, as the vehicle passes therethrough, the following findings were obtained.

Firstly, it was found that the vehicle's body is not magnetized evenly all over, but is magnetized the stronger in the area the nearer the bottom thereof. It is noted that there exists a substantially strong magnetic field in the direction across the railroad or railroads, which is generated from a DC current as high as several hundreds or thousands amperes flowing across the electrical lines and the railroad tracks. Considering the differences in the distances between the top portion of a vehicle and an electrical line above the body thereof, and between the bottom portion of the vehicle and the railroad tracks while passing through the railroad crossing, that is, the former distance is generally on the order of approximately 3 m and the latter distance is generally on the order of approximately 0.20 m, it is natural that there is generated a substantial magnetic field on the bottom portion of the vehicle's body dominating over the magnetization on the top portions of the body. In this consideration, a measurement was made to observe the extent of magnetic declination in each of the earth magnetism sensors disposed at different positions around the vehicle's body to be rendered by the effect of magnetization thereof from the external magnetic field such as a railroad crossing, wherein a plurality of earth magnetism sensors are disposed along different vertical lines A, B and C extending at different distances as shown, with each of them being properly compensated for in its orientation with respect to the terrestrial "north" and "west", respectively, and obtaining the results as typically shown in the Table 1 below. From the data shown in Table 1, it is noted that any of such earth magnetism sensors as disposed nearer the bottom portion of the vehicle's body turn out to be under greater influences of magnetization on the vehicle's body.

TABLE 1

| Location of Sensors | | A | B | C |
|---|---|---|---|---|
| Magnetic Declination (Angular Deviation) | 1 | — | 29° towards N | 30° towards S |
| | 2 | 24° towards S | 30° towards N | 33° towards S |
| | 3 | 34° towards S | 36° towards N | 39° towards S |
| | 4 | 41° towards S | 41° towards N | 45° towards S |
| | 5 | 43° to- | 48° to- | 50° to- |

TABLE 1-continued

| Location of Sensors | A | B | C |
|---|---|---|---|
| 6 | wards S — | wards N 48° towards N | wards S — |

Figure 6:
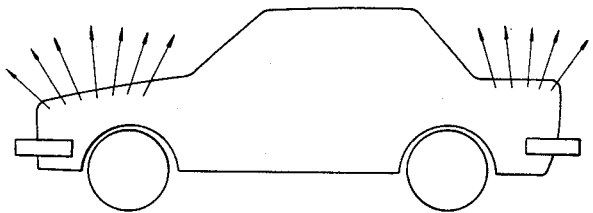
FIG. 6 is a schematic view, similar to FIG. 5, showing the general sense of magnetized field upon the vehicle's body.
Figure 7:
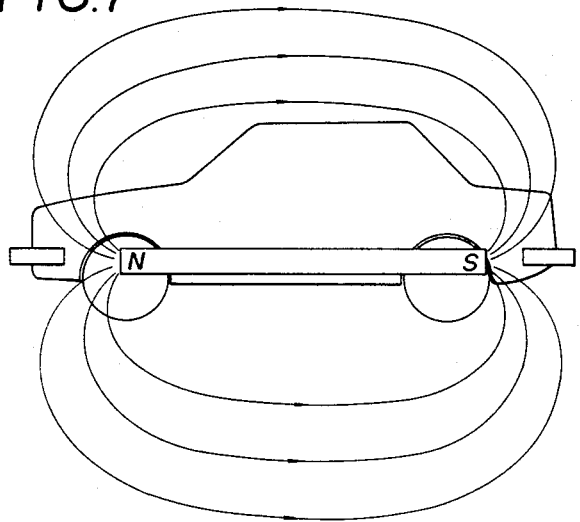
FIG. 7 is a schematic view showing the general distribution of magnetic lines of forces of an equivalent magnet as magnetized upon the vehicle's body.

Secondly, it was also found that there occurs a substantial extent of magnetization generally in the identical polarity and orientation in accordance with the locations of the vehicle's body, irrespective of the extent of magnetization on different points thereof. More specifically, with respect to the upper or bonnet portion and the rear truck portion of the vehicle's body, it is found as typically shown in FIG. 6 that the magnetic dips or inclinations of such magnetic fields as distributed over the leading to trailing portions of the bonnet and rear trunk portions of the vehicle's body, respectively, tend to become generally equal with each other, irrespective of their intensity of magnetization. It is considered that this is because, since the bottom portion of the vehicle's body would generally become an equivalent magnet as a whole as schematically shown in FIG. 7 from the fact that the bottom portion of the vehicle's body is magnetized dominantly over the other portions thereof as stated hereinbefore, there exist magnetic lines of force distributed around the vehicle's body, as viewed in FIG. 7. Referring to Table 2, there is shown the typical orientation of each magnetic field as distributed along measuring points A through G over the bonnet portion of the vehicle, as typically shown in FIG. 8. According to this measurement, because it is noted that all the orientation of individual magnetic fields is in the vertical plane including the longitudinal axis of the vehicle's body, they are indicated in terms of an angle defined with the horizontal plane, accordingly.

TABLE 2

| Location | A | B | C | D | E | F | G |
|---|---|---|---|---|---|---|---|
| Orientation of Magnetic Field | 38° | 62° | 76° | 85° | 90° | 93° | 96° |

The second-mentioned characteristics of magnetization upon the vehicle's body become true specifically while the vehicle is passing generally perpendicularly with respect to a railroad crossing. More specifically, when the vehicle passes across the railroad crossing aslant or in a diagonal relationship with respect to the crossing, it is generally observed that the greater the angular deviation each of the magnetic fields as generated on the vehicle's body has, the greater is an angle of diagonal path of passing with respect to the railroad crossing, in contrast with the case where the vehicle passes across the railroad crossing at generally right angles with respect thereto. On the other hand, at locations of magnetization where the orientation of a magnetic field comes to be in a generally right angled relationship with the horizontal plane (e.g., at a point "E" as viewed in FIG. 8) while passing across the crossing at right angles thereto, it is observed that the orientation of such magnetic fields would then be inclined at a lesser angle of inclination, or in an almost vertical direction therewith, even when the vehicle is passing diagonally with respect to the crossing.

Figure 1:
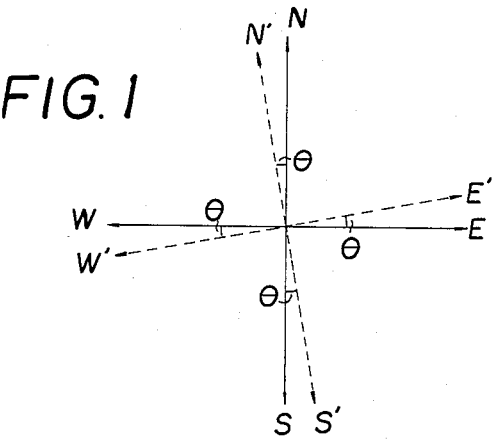
FIG. 1 is a schematic view which shows the general relationship between a bearing observation as detected by a direction finder magnet and a given direction as observed by way of a map.
Figure 2:
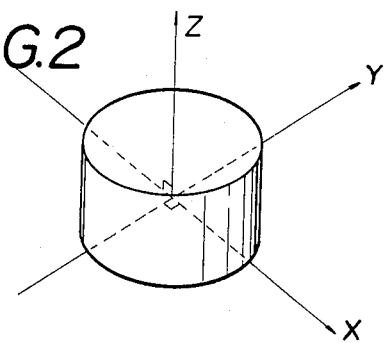
FIG. 2 is a schematic view showing the bearing indicating needle axis of an earth magnetism sensor.
Figure 3:
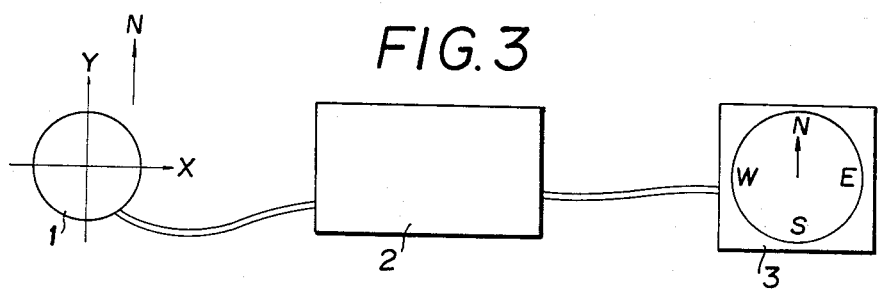
FIG. 3 is a schematic view showing a general construction of a bearing detecting apparatus which employs an earth magnetism sensor.

Generally, the earth magnetism sensor for use in a direction finder is designed to detect an earth magnetism in the horizontal plane as shown with the X-Y plane in FIG. 2, but cannot detect any earth magnetism in the vertical direction with respect to the horizontal plane. In this connection, therefore, if it is arranged such that the vertical direction Z of an earth magnetism sensor is orientated in coincidence with the direction of the magnetic lines of force from the magnetized field on the vehicle's body, there would no longer be any influence of that magnetized field on the vehicle's body upon the earth magnetism sensor. In order to attain a proper or accurate observation of a current bearing of a vehicle by way of a direction finder, it is preferred to have the earth magnetism sensor in a direction finder disposed in a parallel relationship with respect to the ground surface so that only the horizontal component of the earth magnetism may be detected.

In consideration of the foregoing, it is noted that an earth magnetism sensor may well be relieved of any improper influences of the magnetized fields on the vehicle's body while passing through a railroad crossing, if the earth magnetism sensor is placed horizontally at such a specific point where the orientation of the magnetized field comes to be perpendicular with respect to the horizontal plane, even when the vehicle passes across the railroad crossing diagonally, or at a certain angle of inclination.

Figure 8:
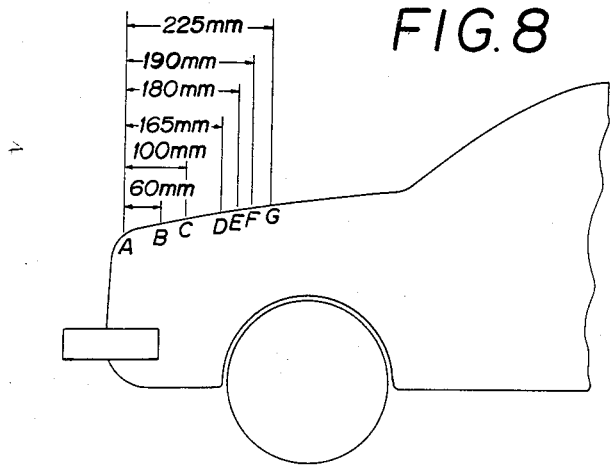
FIG. 8 is a fragmentary schematic view showing the points of observation for a sense of magnetization upon the upper or bonnet portion of a vehicle.
Figure 9:
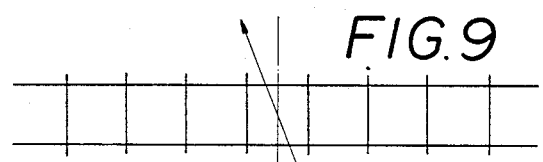
FIG. 9 is a schematic view showing a typical manner of entrance of the vehicle when passing through a railroad crossing.
Figure 10:
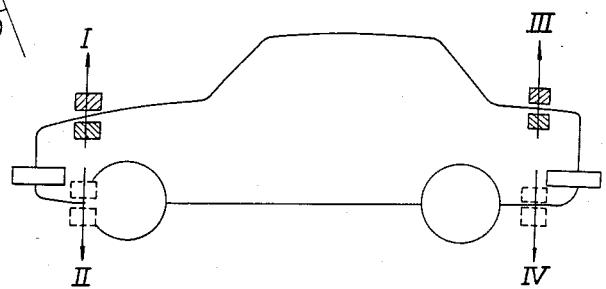
FIG. 10 is a schematic view which shows optimal locations of earth magnetism sensors upon the vehicle's body.

Referring to Table 3, there is presented the results of measurement on the angular deviation "$\phi$" in the angle of indication of the pointer of the direction finder provided on a vehicle, while passing across a railroad crossing at the angle of "$\theta$" with respect to the crossing, as schematically shown in FIG. 9, wherein the earth magnetism sensor is installed horizontally at the point "E" on the vehicle's bonnet portion where the orientation of a magnetized field is directed at right angles with respect to the horizontal plane, as typically shown in FIG. 8. Incidentally, when the earth magnetism sensor is disposed at the point "C" on the bonnet portion of the vehicle, and inclined at the angle of 14° with respect to the horizontal, i.e., at right angles with respect to the 76° orientation of the magnetized field, and when the vehicle is passing across the railroad crossing at the angle "$\theta$" equal to 45°, it was observed that the angle "$\phi$" is 180°. In this connection, it was also observed that with such angular relationship in the vehicle's attitude with respect to the railroad crossing, a component of the output obtained from the sensor in the direction that the vehicle proceeds, i.e., the output component of the sensor on the X-axis, would be reduced by an amount multiplied by the trigonometric value of cos 14°. Therefore, under such a circumstance, it is essential to increase the X-axis component of the earth magnetism sensor by multiplying it with 1/ cos 14°. On the other hand, because it senses the vertical component of earth magnetism on the spot of observation, it is also necessary to apply a due compensation for same.

TABLE 3

| Angle $\theta$ | 0° | 30° | 45° |
|---|---|---|---|
| Angle $\phi$ | 0° | 18° | 45° |

In this consideration, it is preferred that the earth magnetism sensor for use in a bearing detecting apparatus provided on an automotive vehicle to be placed horizontally at the spot where the orientation of the magnetized field upon the vehicle's body while passing across a DC-supplied railroad crossing comes to be generally at right angles with respect to the horizontal plane. With such an advantageous arrangement, the earth magnetism sensor now operates to accurately detect the earth magnetism existing in the horizontal direction without any substantial disturbance from the magnetized field on the vehicle's body.

In this connection, it is noted that such points where the orientation of the magnetized field comes to be generally at right angles with respect to the horizontal plane are, for a typical passenger car; the position I on the bonnet portion of the vehicle, the position II which is right below the position I, the position III on the rear trunk cover, and the position IV which is directly below the position III, respectively. In practice, it is possible to mount the earth magnetism sensor in any of such positions by, for instance, providing an opening in the bonnet portion, the rear trunk cover, or the like structures of a vehicle. However, in consideration of the readiness of mounting the earth magnetism sensor upon a desired place of the vehicle's body as set forth hereinbefore, and also of a possible immediate effect that might be caused upon the sensor from a magnetized obstacle such as a railroad track or a piece of steel existing on the ground surface, etc., it is advisable that the earth magnetism sensor be mounted in a place such as upon or below the bonnet portion at the point I, or above or below the rear trunk cover at the point III. In this connection, however, should the earth magnetism sensor be mounted at either of the side edges around the position I or III of the bonnet portion or the rear trunk portion of the vehicle, there would very possibly result an undesired influence of magnetic disturbances from such magnetized obstacles, and consequently, it is required that the earth magnetism sensor be mounted either at or near the longitudinal center line of the vehicle's body and at such suitable positions I and III, as stated above.

Figure 11:
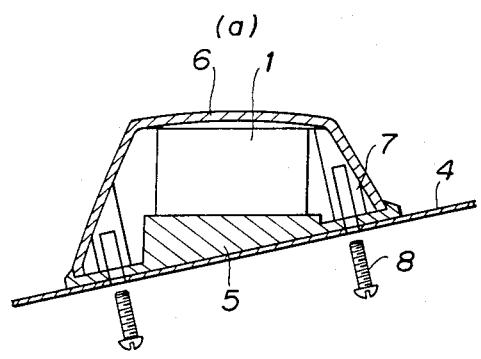
FIGS. 11(a) and 11(b) are a side elevational view and a front elevational view, respectively, of typical means for mounting the earth magnetism sensor upon the vehicle's body.
Figure 11:
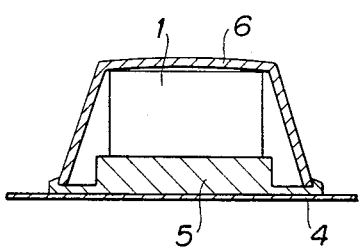

FIGS. 11(a) and (b) show, respectively, a typical example of practical means which is designed to mount the earth magnetism sensor upon the bonnet portion or the rear trunk cover of a vehicle. The construction of this means is such that the earth magnetism sensor 1 is mounted in the horizontal position upon a base 5, which is formed in accordance with the general curvature and slope designs of the bonnet 4, whereupon a cover 6 is to be placed in position, the cover 6 with a boss portion 7 being secured integrally upon the bonnet portion 1 by using screws 8 extending from beneath the bonnet 4.

FIGS. 12(a) and (b) are a top plan view and a side elevational view, respectively, showing the general construction of an earth magnetism sensor mount, by way of a preferred embodiment, which is applicable for use in an emblem top on the bonnet portion of an automotive vehicle, wherein an emblem top 9 is provided with an opening therewithin for holding an earth magnetism sensor 1 in the horizontal position when the emblem top 9 is mounted in position upon the bonnet (not shown) with aid of plastic resin mold 10 charged around the sensor 1 within the opening. More specifically, it is of course possible in practice that the emblem top 9 is preliminarily formed with a mounting seat for holding the earth magnetism sensor at a desired angle so as to be mounted finally in the desired horizontal position within the emblem top, and that the earth magnetism sensor may be fixed securely by way of screws or adhesive in position within the emblem top, as desired.

As fully explained hereinbefore, according to the present invention, there is provided an improved mount for an earth magnetism sensor for use in a bearing detecting apparatus or direction finder to be provided on an automotive vehicle, which can afford efficient prevention against an angular deviation between a current direction of a horizontal component of the earth magnetism effect as detected from the earth magnetism sensor and a given direction as observed on the map by way of a due compensation of a possible magnetic declination by intentionally offsetting a due amount of such magnetic declination, which is particular to that point of observation, in the horizontal direction with respect to a current travel direction or azimuth of the vehicle when installing the earth magnetism sensor of the bearing detecting apparatus. There is thus assured an accurate bearing indication of the vehicle, irrespective of any magnetic disturbances from a strong external source of magnetism, which can properly coincide with a given desired orientation on a map.

It is now clear that the objects as set forth hereinbefore among those made apparent from the preceding description are efficiently attained, and since certain changes and modifications may be made in the foregoing description without departing from the spirit and scope of the invention, it is intended that all matter contained in the foregoing description or shown in the accompanying drawings shall be interpreted as illustrative and not in any way limiting sense.

It is also to be understood that the appended claims are intended to cover all of such generic and specific features particular to the invention as disclosed herein and all statements relating to the scope of the invention, which as a matter of language might be said to fall thereunder.

What is claimed is:

1. A method of mounting an earth magnetism sensor adapted to detect a horizontal component of the earth magnetism for a bearing detecting apparatus, on a vehicle, comprising the step of:

mounting said earth magnetism sensor in a horizontal position within a mount member mounted on a sloped bonnet portion of the vehicle, at a location at which an orientation of magnetic field, which is generated when the vehicle body becomes magnetized, crosses a horizontal plane substantially at a right angle;

said location being substantially intermediate with respect to the vehicle height, proximal the front end of said vehicle, and substantially at or near a longitudinal center line of said vehicle; and said earth magnetism sensor being mounted at said location such that an axis of detecting a primary direction of said sensor is horizontally angularly offset by a number of degrees corresponding to a terrestrial magnetic declination at a given observation point with respect to a desired orientation by way of a map.

2. A mounting method according to claim 1, wherein:

said mount member comprises an emblem top on said bonnet portion of said vehicle.

3. A method of mounting an earth magnetism sensor adapted to detect a horizontal component of the earth magnetism for a bearing detecting apparatus, on a vehicle, comprising the step of:

mounting said earth magnetism sensor in a horizontal position within a mount member mounted on a rear trunk cover of a vehicle, at a location at which an orientation of magnetic field, which is generated when the vehicle body becomes magnetized, crosses a horizontal plane substantially at a right angle;

said location being substantially intermediate with respect to the vehicle height, proximal the rear end of said vehicle, and substantially at or near a longitudinal center line of said vehicle; and said earth magnetism sensor being mounted at said location such that an axis of detecting a primary direction of said sensor is horizontally angularly offset by a number of degrees corresponding to a terrestrial magnetic declination at a given observation point with respect to a desired orientation by way of a map.

* * * * *